Oct. 19, 1948.    G. C. PEARCE    2,451,576
ELECTRICAL CONTROL SYSTEM
Filed Feb. 28, 1941
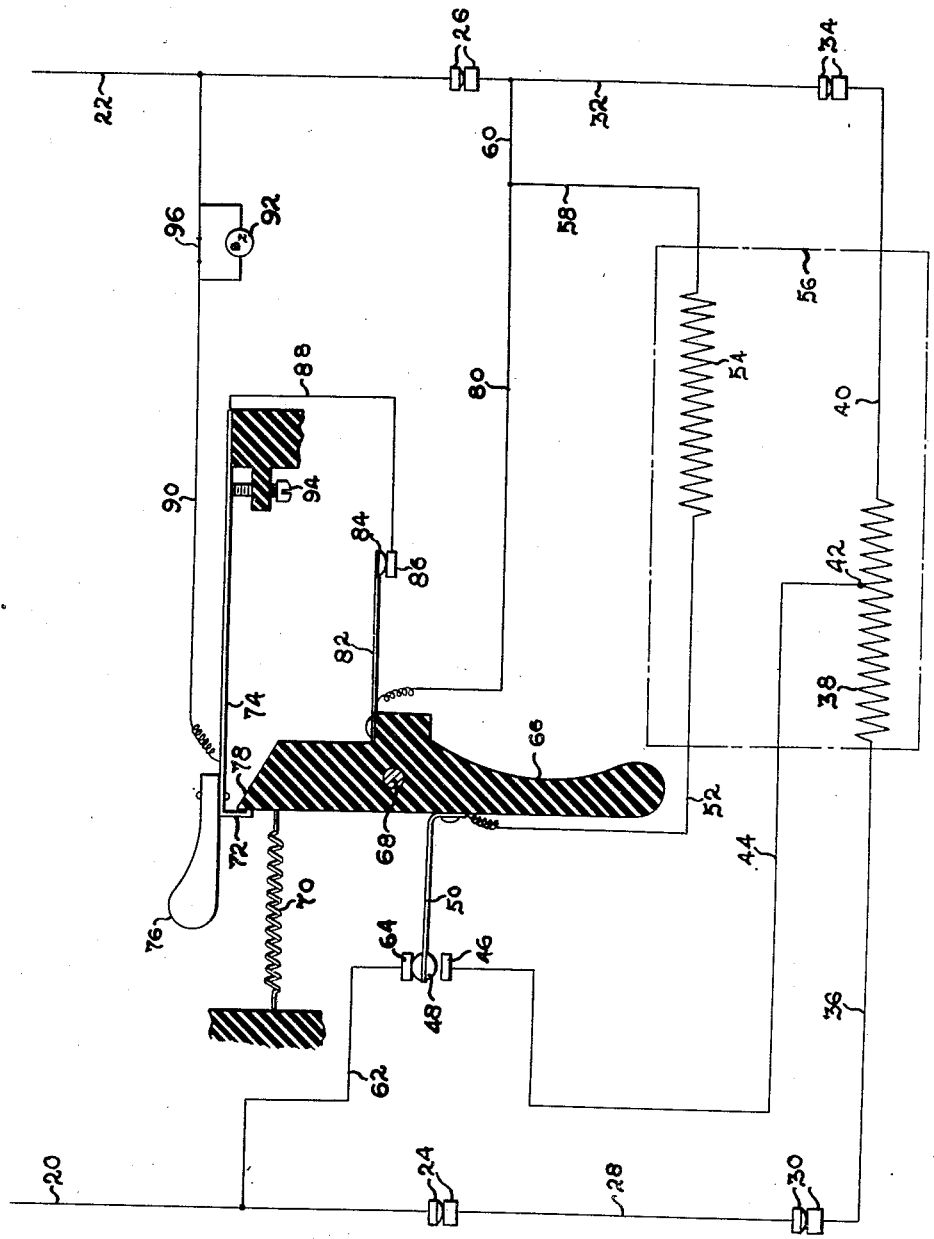
INVENTOR.
George C Pearce
BY Spencer Hardman and Fehr
attorneys Patented Oct. 19, 1948

2,451,576

UNITED STATES PATENT OFFICE 2,451,576

ELECTRICAL CONTROL SYSTEM

George C. Pearce, Dayton, Ohio, assignor to General Motors Corporation, Dayton, Ohio, a corporation of Delaware Application February 28, 1941, Serial No. 381,194

6 Claims. (Cl. 219—20)

This invention relates to a domestic appliance and more particularly to automatic controls for electric ranges.

At present, the better electric ranges are equipped with mechanical means operated mechanically by the opening movement of the oven thermostat for mechanically moving a switch to change the circuit arrangement of the oven from the preheat arrangement to the baking arrangement at the end of the first heating cycle. This feature adds a load upon the thermostat, causing it to over-shoot upon the first temperature cycle of the oven and causing the attainment of a temperature of from 25° to 40° F., higher than the temperature for which the thermostat is set and normally operates. Some other arrangements have been devised to provide automatic changes from preheat circuit to the baking circuit arrangement, but I find that such arrangements have not been sufficiently simple and inexpensive for practical use.

It is an object of my invention to provide an automatic change for electric ovens from the preheat circuit arrangements to the baking circuit arrangement which will not detrimentally affect the operation of the thermostat and which is simple, reliable and practical.

It is another object of my invention to provide an automatic change from the preheat circuit to the baking circuit arrangement in which a simple, quiet, electrically-operated means is provided for accomplishing the change from the preheat circuit arrangement to the baking circuit arrangement.

It is another object of my invention to provide an electrically-operated means connected in shunt with one of the thermostat contacts in such a way that upon the opening of the thermostat, the electrically-operated means will be energized through the shunt circuit to cause the change from the preheat circuit to the baking circuit arrangement.

It is a further object of my invention to provide an arrangement wherein the electrically-operated means which causes the change from the preheat circuit to the baking circuit arrangement is only energized briefly.

It is another object of my invention to provide an electrically-operated means for changing from the preheat circuit to the baking circuit arrangement which can be easily reset at any time desired.

Further objects and advantages of the present invention will be apparent from the following description, reference being had to the accompanying drawing, wherein a preferred form of the present invention is clearly shown.

In the drawing the figure is a wiring diagram for an electric oven illustrating diagrammatically one form of my invention.

Briefly, I have shown the wiring diagram for a two-unit electric oven with a tap arrangement whereby, for baking, the lower unit operates at full wattage while the upper unit operates at less than half the full wattage. A switch is provided for changing the baking circuit to a preheat circuit and vice versa. This switch causes the upper unit to operate at full wattage along with the lower unit. This switch is biased into the baking circuit position but is provided with a latch whereby it may be latched in the preheat circuit position. Upon the opening of the thermostat contacts, this latch is electrically released through a shunt circuit shunted around one of the thermostat contacts to provide an automatic change from the preheat to the baking circuit arrangement under the bias of the switch.

Referring now to the drawing, there is shown the supply conductors 20 and 22. The supply conductor 20 connects to the thermostat contacts 24 while the supply conductor 22 connects to the thermostat contacts 26. These contacts preferably form the double contacts of a conventional oven thermostat switch such as is shown in Figs. 6 and 7 of the Kahn et al. Patent No. 2,123,699, patented July 12, 1938. In this Kahn et al. patent the double set of contacts is designated by the reference character 37. The contacts 24 are connected by the conductor 28 to a set of broil contacts 30, while the contacts 26 are connected by the conductor 32 to a set of broil contacts 34. These broil contacts are preferably manually opened when it is desired to use the upper unit of the electric oven alone for broiling purposes. They may be operated by a separate knob or they may be operated by the knob used for adjusting the thermostat switch as in the above mentioned Kahn et al. patent which has separate contacts 90 for broiling purposes. However, the Kahn wiring arrangement is quite different and it is necessary to so arrange the operation for my circuit that for broiling, the contacts 24 and 26 are closed while the contacts 30 and 34 are opened.

The contacts 30 are connected by the conductor 36 to one terminal of the lower oven heating unit 38 while the other terminal of the lower oven heating unit 38 is connected by the conductor 40 to the contacts 34. The circuit, thus described, connects the lower oven heating unit 38 across the supply conductors 20 and 22 to cause it to be energized at full voltage and wattage. The wiring circuit is shown connected in the preheat circuit arrangement. For the baking circuit arrangement, a tap 42 is provided upon the lower oven heating unit 38 and is connected by the conductor 44 to stationary contact 46. This stationary contact 46 is adapted to be engaged by a double movable contact 48 provided upon the end of a spring conductor arm 50 which, in turn, is connected by the conductor 52 to the upper oven heating unit 54 provided primarily for broiling purposes. Both the upper and the lower oven heating units are located within the oven compartment 56. The other terminal of the upper heating unit 54 is connected by the conductor 58 to a conductor 60 which, in turn, connects to the conductor 32, which connects through the contacts 26 to the supply conductor 22. When connected in this way, the upper oven heating unit is provided with less than one-half full voltage to provide a wattage input of considerably less than one-fourth of its full input for baking purposes.

For quick preheating of the oven 56 it is desirable to operate both the upper and lower units at the full wattage input. For this purpose, connected to the source conductor 20 is a conductor 62 connecting to a stationary contact 64 with which the double contact 48 is adapted to make contact. As shown in the drawing, when the contact 48 is in engagement with the contact 64, the current flows from the source conductor 20 through the conductor 62, the contacts 64 and 48, the conductors 50 and 52, the upper heating unit 54, the conductors 58 and 60 and the contacts 26 to the other source conductor 22. The lower oven heating unit 38 is energized at full voltage and wattage as before so that both the upper heating unit 54 and the lower heating unit 38 operate at full wattage to quickly raise the oven temperature.

In order to automatically change the movable contact 48 into contact with the contact 46 when the oven 56 has reached the proper temperature for which the oven thermostat is set, I provide a simple novel mechanism and arrangement. For this purpose, I provide a handle 66 which is pivoted upon the pin 68 and carries the spring contact arm 50. This handle 66 is biased in a counterclockwise direction by the tension spring 70. The handle 66 is provided with a chisel-shaped end 78 which in the preheat position is latched by the hooked end 72 of a bimetal latch 74 to hold the movable contact 48 in engagement with the stationary contact 64 to connect the circuits in the preheat arrangement. The bimetal latch 74 is also provided with a handle 76 by which the latch may be manually released at any time to allow the handle to move in a counterclockwise direction under the influence of the tension spring 70 to change the circuit arrangement from preheat to the baking circuit arrangement. Likewise, the circuit arrangement may be changed from bake to preheat at any time by moving the handle 66 in a clockwise direction to latch the upper end 78 of the handle as shown in the drawing.

The bimetal latch 74 is connected in a shunt circuit extending around the thermostat contacts 26 including the conductor 80 which extends from the conductor 60 to a spring arm 82 provided upon the handle 66 and carrying a movable contact 84 which is held in engagement with a stationary contact 86 when the handle is in the latched preheat position. The stationary contact 86 is connected by a conductor 88 with the anchored end of the bimetal 74 while the free end of the bimetal 74 is connected to a conductor 90 which, in turn, connects to the source conductor 22. As long as the contacts 24 and 26 remain in the closed position, no current flows through this shunt circuit. However, when the oven 56 reaches the temperature for which the thermostat is set, the contacts 24 and 26 will be opened. This will cause current to flow from the source conductor 20 through the conductors 62, 50 and 52, the upper heating unit 54, the conductors 58, 80, 82 and 88 and through the bimetal 74 as well as the conductor 90 into the other source conductor 22. The bimetal 74 is so made that when current passes through it, it will be heated and will bend upwardly to release its hooked end from engagement with the upper end 78 of the handle 66. It is also made so that it will have a comparatively high resistance and will heat so rapidly that it will substantially instantaneously release the latch of the handle 66 and allow the handle to move to the baking circuit position. In moving to the baking circuit position, the handle also opens the contacts 84 and 86, thereby deenergizing the bimetal 74. Thus, the bimetal 74 is only energized instantaneously.

A buzzer 92 may be connected in series with the conductor 90 by opening the switch 96 so as to give an audible signal when the oven has been preheated. The bimetal may be adjusted by the adjusting screw 94 to vary the time which is required to release the latch upon heating. Instead of a bimetal latch, an electromagnet may be used to release the latch which holds the handle in the preheat position, or some other electrically-operated means may be used for this purpose. It will be seen that this arrangement applies no mechanical load to the thermostat and has no detrimental effect upon its operation.

For broiling, the handle 66 is latched in the preheat position, the broil contacts 30 and 34 are opened, and the thermostat is adjusted to such a position that it will not open during the broiling operation which is carried on with the oven door open.

While the invention is illustrated with reference to the tap system preheat-bake circuit arrangement, it is also applicable to other preheat-bake arrangements, one example being illustrated in the above mentioned Kahn et al. patent.

While the form of embodiment of the invention as herein disclosed, constitutes a preferred form, it is to be understood that other forms might be adopted, all coming within the scope of the claims which follow.

What is claimed is as follows:

1. An electric heating means for heating a zone to be heated, supply conductors for connecting the heating means to a power source, thermostatic switch means in one of the supply conductors for controlling the connection of the heating means to the power source to regulate the temperatures of said zone, connecting means for connecting said heating means selectively into a baking circuit arrangement and into a preheat circuit arrangement, means for setting the connecting means in the preheat circuit arrangement, electrically operated means for controlling the operation of said connecting means to change from the preheat circuit arrangement to the baking circuit arrangement means for holding the connecting means in the baking circuit arrangement except when set in the preheat circuit arrangement, and means for positively energizing said electrically operated means by the potential existing across said thermostatic switch means upon its opening.

2. In a heat control system for a domestic electric oven having an upper heating means and a lower heating means, supply conductors for connecting the heating means to a power source, a thermostatic switch means in one of said supply conductors for connecting and disconnecting said heating means from the power source, a second switch means for connecting said heating means selectively into a preheat circuit arrangement in which the upper and lower heating means are connected in parallel circuit arrangement to the supply conductors to energize them at their full wattage input and a baking circuit arrangement in which only the lower heating means is connected directly across the supply conductors to energize it at the full wattage input, means for biasing said second switch means only into one of said circuit arrangements to normally hold the second switch means in said one circuit arrangement until set in the other, means for moving said second switch means into the other of said circuit arrangements, an electrical shunt circuit shunting said thermostatic switch means in said one supply conductor, an electrically releasable holding means in said shunt circuit for holding the second switch means in the other of the circuit arrangements as long as the thermostatic switch means is in closed circuit position and the shunt circuit thereby deenergized and for releasing the second switch means upon the opening of the thermostatic switch means and the consequent energization of the shunt circuit.

3. In a heat control system for a domestic electric oven having an upper heating means and a lower heating means, supply conductors for connecting the heating means to a power source, a thermostatic switch means in one of said supply conductors for connecting and disconnecting said heating means from the power source, a second switch means for connecting said heating means selectively into a preheat circuit arrangement in which the upper and lower heating means are connected in parallel circuit arrangement to the supply conductors to energize them at their full wattage input and a baking circuit arrangement in which only the lower heating means is connected directly across the supply conductors to energize it at the full wattage input, means for biasing said second switch means only into one of said circuit arrangements to normally hold the second switch means in said one circuit arrangement until set in the other, means for moving said second switch means into the other of said circuit arrangements, an electrical shunt circuit shunting said thermostatic switch means in said one supply conductor, an electrically releasable holding means in said shunt circuit for holding the second switch means in the other of the circuit arrangements as long as the thermostatic switch means is in closed circuit position and the shunt circuit thereby deenergized and for releasing the second switch means upon the opening of the thermostatic switch means and the consequent energization of the shunt circuit, and means operable upon the release of said second switch means for opening said shunt circuit.

4. In a heat control system for a domestic electric oven having an upper heating means and a lower heating means, supply conductors for connecting the heating means to a power source, a thermostatic switch means in one of said supply conductors for connecting and disconnecting said heating means from the power source, a second switch means for connecting said heating means selectively into a preheat circuit arrangement in which the upper and lower heating means are connected in parallel circuit arrangement to the supply conductors to energize them at their full wattage input, and a baking circuit arrangement in which only the lower heating means is connected directly across the supply conductors to energize it at the full wattage input, said second switch means comprising a double-throw switch and a single-throw switch, said double-throw switch controlling the selection of the preheat and the bake circuit arrangements, an electrical shunt circuit having said single-throw switch connected therein shunting said thermostatic switch means in said one supply conductor, means for moving said second switch means to place the double-throw switch in the preheat arrangement and to close the single-throw switch, an electrically releasable holding means connected in said shunt circuit for holding when deenergized the double-throw switch in the preheat position and the single-throw switch closed and when energized by the opening of the thermostatic switch means for releasing the double-throw and the single-throw switches, and means for biasing said single-throw switch to the open position and the double-throw switch into the bake circuit arrangement upon release of the holding means for normally holding the double-throw switch in the bake circuit arrangement until set to the preheat circuit arrangement.

5. In a heat control system for a domestic electric oven having an upper heating means and a lower heating means, supply conductors for connecting the heating means to a power source, a thermostatic switch means in one of said supply conductors for connecting and disconnecting said heating means from the power source, selective means for connecting said upper heating means selectively across the full potential of the supply conductors in parallel electric circuit with the lower heating means to provide a preheat circuit arrangement and across a lesser potential of the supply conductors in the baking circuit arrangement, means for biasing said selective means only into the baking circuit arrangement to hold the selective means in the baking circuit arrangement until set to preheat, means for moving the selective means into the preheat circuit arrangement, an electrical shunt circuit shunting said thermostatic switch means in said one supply conductor so that it is energized when the thermostatic switch means opens, an electrically releasable holding means connected in said shunt circuit for holding when deenergized said selective means in the preheat circuit arrangement and for releasing said selective means when energized by the opening of the thermostatic switch means for controlling the movement of the selective means from the preheat to the baking circuit arrangement.

6. In an electrical system, three conductors, means for supplying electric energy to said conductors to maintain a substantially higher potential across a first and second of the three conductors than across either the first or second conductor and the third conductor, a resistance having one end connected to said first conductor, a first switch means located in series with the first conductors between the connecting point of said resistance and the supply source, a double-throw switch means having its movable element connected to the other end of said resistance and having a first stationary contact connected to the second conductor and a second stationary contact connected to the third conductor, means for biasing the movable element from the first contact into contact with the second contact, means for moving the movable element in contact with the first contact, latch means for holding the movable element in contact with the first contact, a shunt circuit shunting said first switch means and connected at its ends to said first conductor on opposite sides of said first switch means, electrically operated means connected to and energized by said shunt circuit for releasing said latch means to allow the movable element to move from the first to the second contact under the power of the biasing means, and means operable upon the movement of the movable element into contact with the second contact for opening the shunt circuit.

GEORGE C. PEARCE.

REFERENCES CITED

The following references are of record in the file of this patent:

UNITED STATES PATENTS

| Number | Name | Date |
| --- | --- | --- |
| 1,543,710 | Hands | June 30, 1925 |
| 1,680,398 | Thomas | Aug. 14, 1928 |
| 2,023,117 | Biebel | Dec. 3, 1935 |
| 2,095,383 | Finch | Oct. 12, 1937 |
| 2,137,073 | Bletz | Nov. 15, 1938 |
| 2,218,778 | Weimer | Oct. 22, 1940 |
| 2,224,983 | Parkhurst | Dec. 17, 1940 |
| 2,260,840 | Rowe | Oct. 28, 1941 |
| 2,302,924 | Valverde | Nov. 24, 1942 |